H. C. SHAY.
CULTIVATOR AND BEET DIGGER.
APPLICATION FILED NOV. 2, 1911.
1,041,684.
Patented Oct. 15, 1912.
2 SHEETS—SHEET 1.
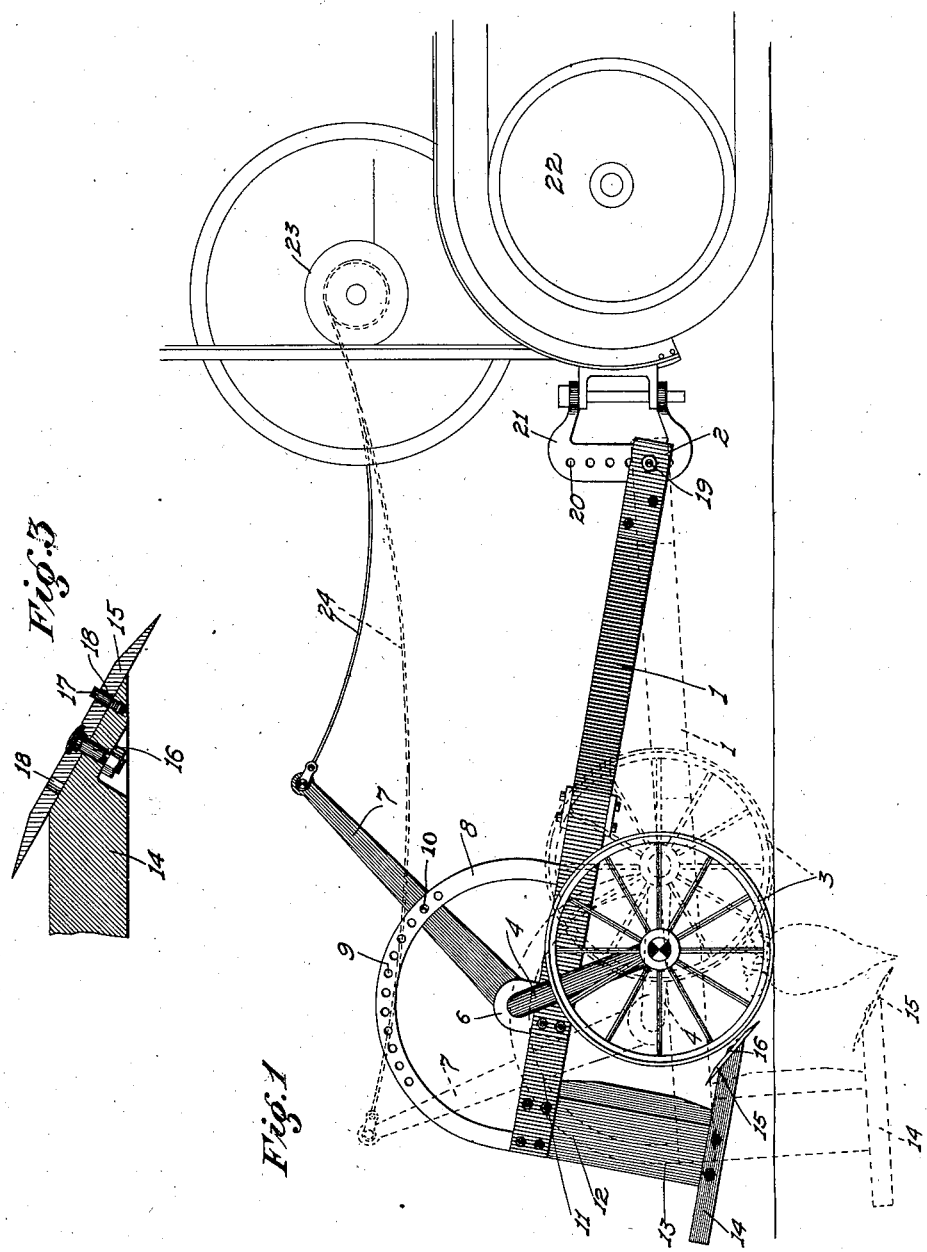
Witnesses
Inventor
H. C. Shay
By
Perry S. Webster
Attorney H. C. SHAY.
CULTIVATOR AND BEET DIGGER.
APPLICATION FILED NOV. 2, 1911.
1,041,684.
Patented Oct. 15, 1912.
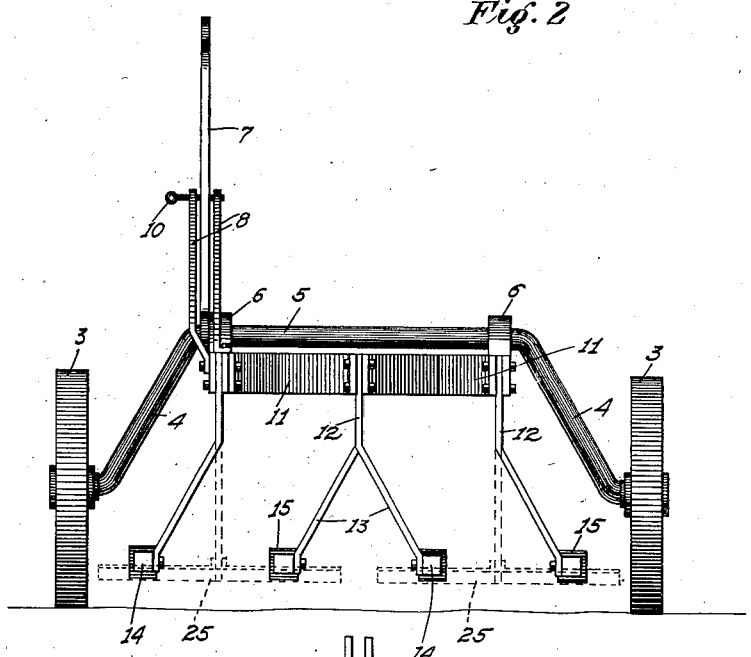
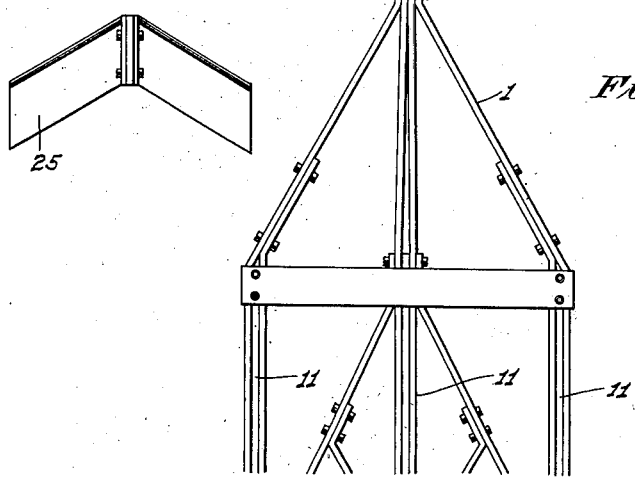

UNITED STATES PATENT OFFICE.

HERMAN C. SHAY, OF HAMILTON CITY, CALIFORNIA.

CULTIVATOR AND BEET-DIGGER.

1,041,684.  Specification of Letters Patent.  Patented Oct. 15, 1912.

Application filed November 2, 1911. Serial No. 658,138.

*To all whom it may concern:*

Be it known that I, HERMAN C. SHAY, a citizen of the United States, residing at Hamilton City, in the county of Glenn, State of California, have invented certain new and useful Improvements in Cultivators and Beet-Diggers; and I do declare the following to be a full, clear, and exact description of the same, such as will enable others skilled in the art to which it appertains to make and use the same, reference being had to the accompanying drawings, and to the characters of reference marked thereon, which form a part of this application.

This invention relates to improvements in farm implements, and particularly to cultivators and beet diggers, the object of the invention being to produce a cultivator which can also be used for a beet digger, which cultivator can be adjusted to cut at a variety of predetermined depths, whereby if used for cultivators, the same can be used to cultivate the surface lightly for weeds or can be used to dig at a great depth in order to turn the soil over to a greater degree. Also by such adjustment the same can be made to dig small beets or large beets without digging into an unnecessary amount of earth.

A further object of the invention is to produce a simple and inexpensive device, and yet one which will be exceedingly effective for the purposes for which it is designed.

One of the particular points of the invention is the improved method of lifting the cultivator or digger from the ground, as will appear.

These objects I accomplish by means of such structure and relative arrangement of parts as will fully appear by a perusal of the following specification and claims.

In the drawings similar characters of reference indicate corresponding parts in the several views.

Figure 1 is a side elevation of the complete implement showing how it can be connected with a traction engine or other draft means. Fig. 2 is a rear elevation of the complete implement. Fig. 3 is a fragmentary view in section showing the means of applying the digging points or blades. Fig. 4 is a top plan view of the forward end of the frame of the implement. Fig. 5 is a top plan view of a modified form of blade shown in the other views.

Referring now more particularly to the characters of reference on the drawings, I first provide a main frame 1, provided with a projecting tongue member 2.

The numeral 3 designates the wheels of the implement mounted on upwardly inclining shafts 4, having a cross shaft 5 at its upper end turnably journaled in a bearing 6 on the top of the frame 1. This shaft is provided with an upwardly projecting lever 7 moving through a quadrant 8 provided with a plurality of holes 9 in which the lever 7 may be fixed in a predetermined position by a pin 10.

The rear end of the frame 1 is provided with a plurality of spaced bars 11 between which are bolted downwardly projecting bars 12 having the lower portions projecting at an angle as at 13, and carrying beveled blocks 14. On each of the blocks 14 is mounted a double edged blade 15 having one bolt 16 projecting therethrough and having an upwardly projecting stud 17 adapted to project into either one of two orifices 18 spaced on each side of the bolt 16. Either one of these orifices may be used accordingly as one edge of the blade is turned to the outside or inside respectively. This stud holds the blade rigid with respect to the block 14 without the necessity of using two bolts.

The forward end of the tongue 2 is provided with a pin 19 adapted to fit into any one of the holes 20 in a clevis 21, suitably connected to the traction engine or other draft means 22.

For the purpose of raising or lowering the blades 15 I provide a spool or nigger-head 23 keyed to a shaft on the engine 22. Over this is thrown one or more turns of rope or cable 24 connected with the lever 7. When it is desired to lower the blades, as shown by dotted line in Fig. 1, the pin is removed from the quadrant and the weight of the frame causes the wheels to move forward, thus lowering the frame 1 and its connected parts, including the blades 15, all as shown by the dotted lines in Fig. 1. In order to raise these blades the loose end of the rope is pulled tight on the spool or "Nigger-head," and the latter revolving draws the lever 7 back to its former position, which presses the wheels 3 downward, and raises the frame

1 and its connected parts. This is the preferred method of raising and lowering the frame, but other methods of accomplishing this end may be used, such as a friction controlled drum instead of the keyed spool or "nigger-head." The lever 7 may be fixed by pin 10 in any desired position to make the blades stationary at any predetermined height. This adjustable feature is extremely advantageous when the blades run into a rut or trunk of a tree in the ground, in which event the implement may be backed up and the spool operated at the same time, which will raise the blades gradually as the implement is backed, which permits it to be readily disengaged from the obstruction.

The members 12 may be placed one in front of each other, as shown in the central one in Fig. 2, which will provide a better distribution of the digging and cultivating done by the blades 15.

If desired, instead of the double-edged blade shown in the main figures, a V-shaped single-edged plow-shaped blade 25 may be used, as shown in Fig. 5 and by dotted lines in Fig. 2. In this event there would be a lesser amount of blades used as is designated in Fig. 2.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention.

Having thus described my invention, what I claim as new and useful and desire to secure by Letters Patent is:—

A device of the character described comprising the combination of a wheeled frame, a plurality of pairs of spaced bars projecting from the rear end of said frame, a downwardly projecting bar disposed between each of said pairs of bars, each of said downwardly projecting bars having an angular bend, blocks on the lower ends of said last named bars and adapted to carry diggers, said frame being capable of being raised or lowered with respect to the position of its wheels, as described.

In testimony whereof I affix my signature in presence of two witnesses.

HERMAN C. SHAY.

Witnesses:
STEPHEN N. BLEWETT,
FRANK H. CARTER.